United States Patent
Tsunoda et al.

(10) Patent No.: US 10,987,644 B2
(45) Date of Patent: Apr. 27, 2021

(54) FLUID DISPERSING DEVICE AND HEAT TREATMENT DEVICE

(71) Applicant: IHI CORPORATION, Tokyo (JP)

(72) Inventors: Daisuke Tsunoda, Tokyo (JP); Shigeki Sakakura, Tokyo (JP); Nobuyuki Honma, Tokyo (JP); Toshiyuki Sakata, Tokyo (JP); Kohei Tsurugaya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/299,367

(22) Filed: Mar. 12, 2019

(65) Prior Publication Data

US 2019/0209987 A1    Jul. 11, 2019

Related U.S. Application Data

(63) Continuation of application No. PCT/JP2017/036945, filed on Oct. 12, 2017.

(30) Foreign Application Priority Data

Oct. 13, 2016    (JP) .............................. JP2016-201655

(51) Int. Cl.
*B01F 15/00*    (2006.01)
*B01F 15/06*    (2006.01)
(Continued)

(52) U.S. Cl.
CPC .............. *B01F 15/066* (2013.01); *B01F 3/02* (2013.01); *B01F 3/04* (2013.01); *B01F 3/08* (2013.01);
(Continued)

(58) Field of Classification Search
CPC .......... B01F 15/066; B01J 4/005; F28F 13/12
See application file for complete search history.

(56) References Cited

U.S. PATENT DOCUMENTS 2,925,331 A * 2/1960 Kazmierczak ........... B01J 8/048
422/220
4,938,422 A    7/1990 Koves
(Continued)

FOREIGN PATENT DOCUMENTS

CN    2613319 Y    4/2004
CN    201357120 Y    12/2009
(Continued)

OTHER PUBLICATIONS

European Patent Office, "Partial Supplementary European Search Report", issued in European Patent Application No. 17 860 938.4, which is a European counterpart of U.S. Appl. No. 16/299,367, dated Apr. 3, 2020, 15 pages.
(Continued)

*Primary Examiner* — Anshu Bhatia

(57) ABSTRACT

A fluid dispersing device includes a tubular first wall portion with an axis extending in a first direction defined as a central axis, and a second wall portion separated downward from the first wall portion. The second wall portion includes at least one circular member and a disk-like member each having a flat surface for causing a fluid passing through an inner space of the first wall portion to collide therewith. The disk-like member is separated downward from the at least one circular member. The at least one circular member has an outer diameter equal to or smaller than an inner diameter of the first wall portion. The disk-like member has an outer diameter equal to or smaller than an outer diameter of the closest circular member.

7 Claims, 3 Drawing Sheets

(51) Int. Cl.
*B01F 3/02* (2006.01)
*B01F 3/08* (2006.01)
*F28F 13/12* (2006.01)
*B01F 5/02* (2006.01)
*B01F 3/04* (2006.01)
*B01J 4/00* (2006.01)
*B01F 5/00* (2006.01)

(52) U.S. Cl.
CPC .................. *B01F 5/00* (2013.01); *B01F 5/02* (2013.01); *B01F 15/06* (2013.01); *B01J 4/002* (2013.01); *B01J 4/005* (2013.01); *F28F 13/12* (2013.01); *B01F 2015/061* (2013.01); *B01F 2015/062* (2013.01); *B01J 2219/00119* (2013.01)

(56) References Cited

U.S. PATENT DOCUMENTS

| | | | |
|---|---|---|---|
| 2003/0220461 | A1 | 11/2003 | Ohtani et al. |
| 2005/0028874 | A1 | 2/2005 | Olbert et al. |
| 2011/0213186 | A1 | 9/2011 | Di Girolamo et al. |
| 2015/0021002 | A1* | 1/2015 | Hoglund ................. F28F 13/12 165/133 |
| 2017/0157584 | A1* | 6/2017 | Palmer ..................... B01J 8/048 |
| 2017/0304787 | A1 | 10/2017 | Hanada et al. |

FOREIGN PATENT DOCUMENTS

| | | |
|---|---|---|
| CN | 102649738 A | 8/2012 |
| CN | 103611226 A | 3/2014 |
| CN | 104093481 A | 10/2014 |
| DE | 102008029809 A1 | 12/2009 |
| EP | 2 802 410 B1 | 4/2018 |
| FR | 3 024 218 A1 | 1/2016 |
| JP | S49-135806 U1 | 11/1974 |
| JP | S52-022571 A | 2/1977 |
| JP | S56-133330 U1 | 10/1981 |
| JP | 2002-162178 A | 6/2002 |
| JP | 2004-002745 A | 1/2004 |
| JP | 2005-125302 A | 5/2005 |
| JP | 2006-329517 A | 12/2006 |
| JP | 4798655 B2 | 10/2011 |
| JP | 2013-154310 A | 8/2013 |
| JP | 2016-093764 A | 5/2016 |
| WO | 2016/052742 A1 | 4/2016 |

OTHER PUBLICATIONS

European Patent Office, "Extended European Search Report", issued in European Patent Application No. 17 860 338.4, which is a European counterpart of U.S. Appl. No. 16/299,367, dated Jun. 4, 2020, 13 pages.

Japan Patent Office, "Notice of Reasons for Refusal," issued in Japanese Patent Application No. 2016-201655, which s a Japanese counterpart of U.S. Appl. No. 16/299,367, dated Jul. 28, 2020, 2 pages.

European Patent Office, "Communication", issued in European Patent Application No. 17 860 938.4, which is a European counterpart of U.S. Appl. No. 16/299,367, dated Feb. 17, 2021, 9 pages.

China National Intellectual Property Administration, "First Office Action", issued in Chinese Patent Application No. 201780061927.8, which is a Chinese counterpart of U.S. Appl. No. 16/299,367, dated Feb. 24, 2021, 9 pages.

* cited by examiner

FLUID DISPERSING DEVICE AND HEAT TREATMENT DEVICE

CROSS REFERENCE TO RELATED APPLICATIONS

This application is a continuation application of International Application No. PCT/JP2017/036945, filed on Oct. 12, 2017, which claims priority to Japanese Patent Application No. 2016-201655, filed on Oct. 13, 2016, the entire contents of which are incorporated by reference herein.

BACKGROUND

1. Technical Field

The present disclosure relates to a fluid dispersing device and a heat treatment device.

2. Description of the Related Art

Heat exchanger-type reactors heat or cool, using a heat medium, a reaction fluid in a gas or liquid state containing a reaction raw material as a reactant so as to promote a reaction of the reactant. Such a reactor is provided with reaction channels through which a reaction fluid flows and heat medium channels through which a heat medium flows, in which heat exchange between the reaction fluid and the heat medium proceeds during a period from the introduction to the discharge of the reaction fluid and the heat medium. The reactor is provided with the plural reaction channels and heat medium channels so as to increase the heat transfer area to facilitate the heat exchange.

The respective reaction channels provided in such a reactor have openings open on the same plane. To introduce the reaction fluid at a uniform flow rate to the respective openings located at different positions on the same plane, the reaction fluid externally introduced is dispersed in a space facing these openings. Japanese Unexamined Patent Application Publication No. 2004-2745 (Patent Document 1) discloses a gas-phase fluidized bed reactor including a diffuser. The diffuser is provided with a central hole and a plurality of vertical slits so that a fluid supplied from a supply pipe is dispersed in the reactor through the central hole and the slits.

SUMMARY

According to the structure of the reactor disclosed in Japanese Unexamined Patent Application Publication No. 2004-2745, the central hole is open on the bottom surface of the diffuser into which the fluid supplied flows. The fluid having passed through the central hole increases in a flow rate as compared with the flow rate before the fluid passes through the central hole, and a phenomenon is thus induced in which the fluid having passed through the central hole and increased in the flow rate agitates the stream in the reactor because of the flow of the fluid. The agitation of the fluid may cause extrinsic and unnecessary circulation around the diffuser, which prevents preferable dispersion of the fluid to be induced.

An object of the present disclosure is to provide a fluid dispersing device and a heat treatment device capable of dispersing a fluid so as to be introduced into a target portion with great efficiency at a uniform flow rate.

An aspect of the present disclosure is a fluid dispersing device including a tubular first wall portion with an axis extending in a first direction defined as a central axis, and a second wall portion separated downward from the first wall portion. The second wall portion includes at least one circular member and a disk-like member each having a flat surface for causing a fluid passing through an inner space of the first wall portion to collide therewith. The disk-like member is separated downward from the circular member. The circular member has an outer diameter equal to or smaller than an inner diameter of the first wall portion. The disk-like member has an outer diameter equal to or smaller than an outer diameter of the closest circular member.

Another aspect of the present disclosure is a fluid dispersing device including a tubular first wall portion with an axis extending in a first direction defined as a central axis, and a second wall portion separated downward from the first wall portion. The second wall portion includes a circular member and a disk-like member each having a flat surface for causing a fluid passing through an inner space of the first wall portion to collide therewith. The circular member has a shape with an outer diameter and an inner diameter decreased gradually from an upstream side to a downstream side while making a circle about the central axis. The disk-like member is located on the downstream side of the circular member.

Still another aspect of the present disclosure is a heat treatment device utilizing heat exchange between a first fluid and a second fluid, and including a heat exchange unit including a first heat transfer body including a plurality of first channels through which the first fluid flows, and a second heat transfer body including a plurality of second channels through which the second fluid flows, the first heat transfer body and the second heat transfer body being stacked with each other, and a fluid introduction part having a space with an open surface on which openings of the respective first channels in the heat exchange unit are open, and introducing the externally-introduced first fluid to the respective first channels. The fluid introduction part includes the fluid dispersing device according to one of the above aspects to disperse the externally-introduced first fluid in the space.

DESCRIPTION OF THE EMBODIMENTS

Figure 1:
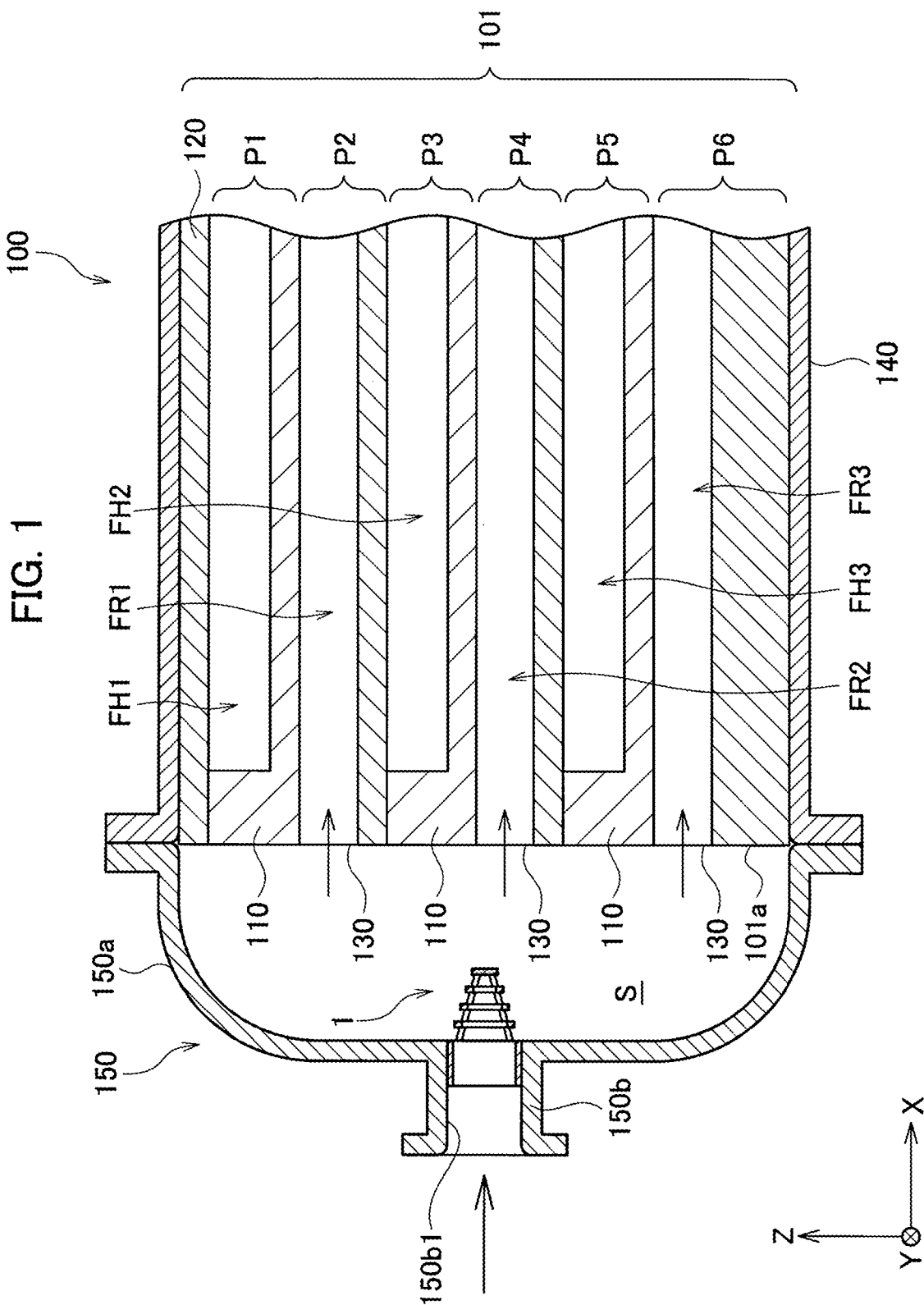
FIG. 1 is a diagram showing a structure of a reactor according to an embodiment of the present disclosure.

Embodiments according to the present disclosure will be described in detail below with reference to the drawings. The following dimensions, materials, and specific numerical values described in the embodiments are shown for illustration purposes only, and the present disclosure is not limited thereto unless otherwise specified. The elements having substantially the same functions and structures illustrated in the description and the drawings are designated by the same reference numerals, and overlapping explanations are not repeated below. The elements described below but not related directly to the present disclosure are not shown in the drawings. In the following explanations of the drawings, a vertical direction is defined as a Z-axis, an extending direction of reaction channels and heat medium channels in a heat exchange unit on a plane perpendicular to the Z-axis is defined as an X-axis, and a direction perpendicular to the X-axis is defined as a Y-axis.

A heat treatment device using a fluid dispersing device according to the present embodiment utilizes heat exchange between a first fluid and a second fluid. Although the heat treatment device according to the present embodiment is illustrated with a case of a reactor, the present embodiment is also applicable to a case of a heat exchanger, for example. The fluid dispersing device according to the present embodiment may also be used for a pressure vessel, instead of such a heat treatment device. The first fluid and the second fluid may be different substances or the same substance depending on the type of the heat treatment apparatus that the present disclosure encompasses. When the heat treatment device according to the present disclosure is a heat exchanger, the first fluid and the second fluid are both a heat medium. The present embodiment is illustrated below with a case in which the first fluid is a reaction fluid or a product, and the second fluid is a heat medium, but may also be applied to the opposite case.

(Reactor)

FIG. 1 is a schematic cross-sectional view showing a part of a structure of a reactor 100 according to the present embodiment. The reactor 100 is a heat exchanger-type reactor in which a reaction fluid in a gas state or in a liquid state containing a reaction raw material as a reactant is heated or cooled so as to promote a reaction of the reactant. The reactor 100 includes a heat exchange unit 101 as a main body, a reaction fluid introduction part 150 and a product drain part, and a heat medium introduction part and a heat medium drain part. For the purpose of describing the fluid dispersing device according to the present embodiment below, the heat exchange unit 101 and the reaction fluid introduction part 150 are enlarged in the drawing without the other fluid introduction parts and fluid drain parts shown in the drawing.

The heat exchange unit 101 includes reaction channels as first channels through which a reaction fluid or a product as a first fluid flows, and heat medium channels as second channels through which a heat medium as a second fluid flows. The heat exchange unit 101 has a counter flow-type structure in which the first fluid and the second fluid flow in directions opposite to each other.

The heat exchange unit 101 includes a plurality of heat transfer bodies P1 to P6, and a lid body 120. The present embodiment is illustrated with a case of including six heat transfer bodies sequentially stacked such that a first heat transfer body P1 is arranged at the uppermost end and a sixth heat transfer body P6 is arranged at the lowermost end in the vertical direction. The six heat transfer bodies P1 to P6 are plate-like members formed of a heat transfer material having thermal resistance.

The first heat transfer body P includes a plurality of first heat medium channels FH1 extending in the X direction and arranged in parallel in the Y direction. The first heat medium channels FH1 supply heat or cold received from the heat medium to the reaction channels provided in the other heat transfer bodies. The first heat medium channels FH1 are grooves defined by two wall portions 110 opposed to each other in the X direction and two wall portions opposed to each other in the Y direction so as to be surrounded on all sides with the upper side in the vertical direction open.

The second heat transfer body P2 is connected to the first heat transfer body P1 on the upper side in the vertical direction. The second heat transfer body P2 includes a plurality of first reaction channels FR1 extending in the X direction and arranged in parallel in the Y direction. The first reaction channels FR1 receive heat or cold from the heat medium flowing in the heat medium channels provided in the other heat transfer bodies, and cause a reaction fluid to react to produce a product. The first reaction channels FR1 are grooves penetrating the second heat transfer body P2 straight from one end to the other end in the X direction with the upper side in the vertical direction open. Although not shown, the first reaction channels FR1 may each be provided with a structured catalyst for promoting the reaction of the reactant.

The same configuration as the first heat transfer body P1 is applied to the third heat transfer body P3 connected to the lower side of the second heat transfer body P2, and is applied to the fifth heat transfer body P5 connected to the lower side of the fourth heat transfer body P4. The same configuration as the second heat transfer body P2 is applied to the fourth heat transfer body P4 connected to the lower side of the third heat transfer body P3, and is applied to the sixth heat transfer body P6 connected to the lower side of the fifth heat transfer body P5.

The lid body 120 is a plate-like member placed on the upper side of the first heat transfer body P1 in the vertical direction. As shown in FIG. 1, the respective heat transfer bodies and the lid body 120 are sequentially stacked on the sixth heat transfer body P6 and connected to each other with the flat plate surfaces parallel to the horizontal plane, so as to fabricate the heat exchange unit 101 as a stacked body. When the heat exchange unit 101 is assembled, the respective members are fixed to each other by a bonding method such as tungsten inert gas (TIG) welding or diffusion bonding, so as to suppress a reduction in heat transfer derived from poor contact between the respective members.

The respective reaction channels FR1 to FR3 are provided with direct openings 130 through which the reaction fluid is introduced from the outside of the heat exchange unit 101, and direct openings (not shown) through which the product is discharged to the outside of the heat exchange unit 101. The respective heat medium channels FH1 to FH3 are provided with no direct opening open to the outside of the heat exchange unit 101. The first heat transfer body P1, the third heat transfer body P3, and the fifth heat transfer body P5 may be provided with communication passages (not shown) penetrating the respective heat medium channels in the lateral direction of the respective heat transfer bodies which is the Y direction, for example. In this case, the heat medium may be introduced from and discharged to the outside of the heat exchange unit 101 through the respective communication passages provided in the first heat transfer body P1, the third heat transfer body P3, and the fifth heat transfer body P5.

The heat exchange unit 101 may be provided with a housing 140 as shown in FIG. 1, or may be surrounded by a heat insulator so as to avoid heat radiation to prevent heat loss.

The reaction fluid introduction part 150 is a casing having an open surface and a curved wall surface 150a curved concavely. The reaction fluid introduction part 150 allows the reaction fluid to be introduced from the outside to the inside of the heat exchange unit 101. A target portion to which the reaction fluid introduction part 150 intends to introduce the reaction fluid is the respective openings 130 of the reaction channels FR1 to FR3 of the heat exchange unit 101. The open surface faces a first side surface 101*a* of the heat exchange unit 101 on which the respective openings 130 are open. The reaction fluid introduction part 150 covers and defines a space S together with the first side surface 101*a*. The reaction fluid introduction part 150 is detachable or openable with respect to the heat exchange unit 101. The detachable or openable reaction fluid introduction part 150 facilitates insertion or removal of the structured catalyst to or from the respective reaction channels FR1 to FR3 by an operator, for example. A central point on the curve of the curved wall surface 150*a* is preferably opposed to a central position on the first side surface 101*a* in the YZ plane.

The reaction fluid introduction part 150 includes an introduction pipe 150*b* through which the reaction fluid is introduced from the outside of the heat exchange unit 101. The introduction pipe 150*b* has an inner wall surface 150*b*1, as shown in FIG. 1. The introduction pipe 150*b* is preferably located around the central point on the curve of the curved wall surface 150*a*, and preferably extends in the same direction as the open direction of the respective openings 130.

The reaction fluid introduction part 150 further includes the fluid dispersing device 1 connected to the introduction pipe 150*b* to project toward the space S. The fluid dispersing device 1 will be described in detail below.

The product drain part has substantially the same shape as the reaction fluid introduction part 150, and is arranged on the opposite side of the reaction fluid introduction part 150 with the heat exchange unit 101 interposed therebetween. A product produced by a reaction during a period in which the reaction fluid passes through the respective reaction channels from the first reaction channels FR1 to the third reaction channels FR3, is recovered by the product drain part, and is discharged via a drain pipe communicating with the product drain part.

The heat medium introduction part and the heat medium drain part are arranged on side surfaces different from the first side surface 101*a* of the heat exchange unit 101, and are connected to the communication passages penetrating the respective heat medium channels of the first heat transfer body P1, the third heat transfer body P3, and the fifth heat transfer body P5. The heat medium introduction part is connected to an introduction pipe through which the heat medium is introduced from the outside of the heat exchange unit 101. The heat medium drain part is connected to a drain pipe through which the heat medium is discharged to the outside of the heat exchange unit 101.

The heat exchange unit 101 may be any of a liquid-liquid heat exchanger, a gas-gas heat exchanger, and a gas-liquid heat exchanger, and the reaction fluid and the heat medium supplied to the reactor 100 may be either gas or liquid. The reactor 100 uses a substance such as a raw material involved in various kinds of chemical reactions as a reactant, and uses a fluid including the reactant as a reaction fluid. The reaction fluid, when flowing through the respective reaction channels FR1 to FR3, receives heat or cold from the heat medium passing through the respective heat medium channels FH1 to FH3, and is heated or cooled to promote a reaction, so that the reactant is converted into a target product. The heat medium is preferably a fluid substance not corroding the constituent materials in the reactor 100, and may be a liquid substance such as water or oil, or a gaseous substance such as combustion gas.

(Fluid Dispersing Device)

Figure 2A:
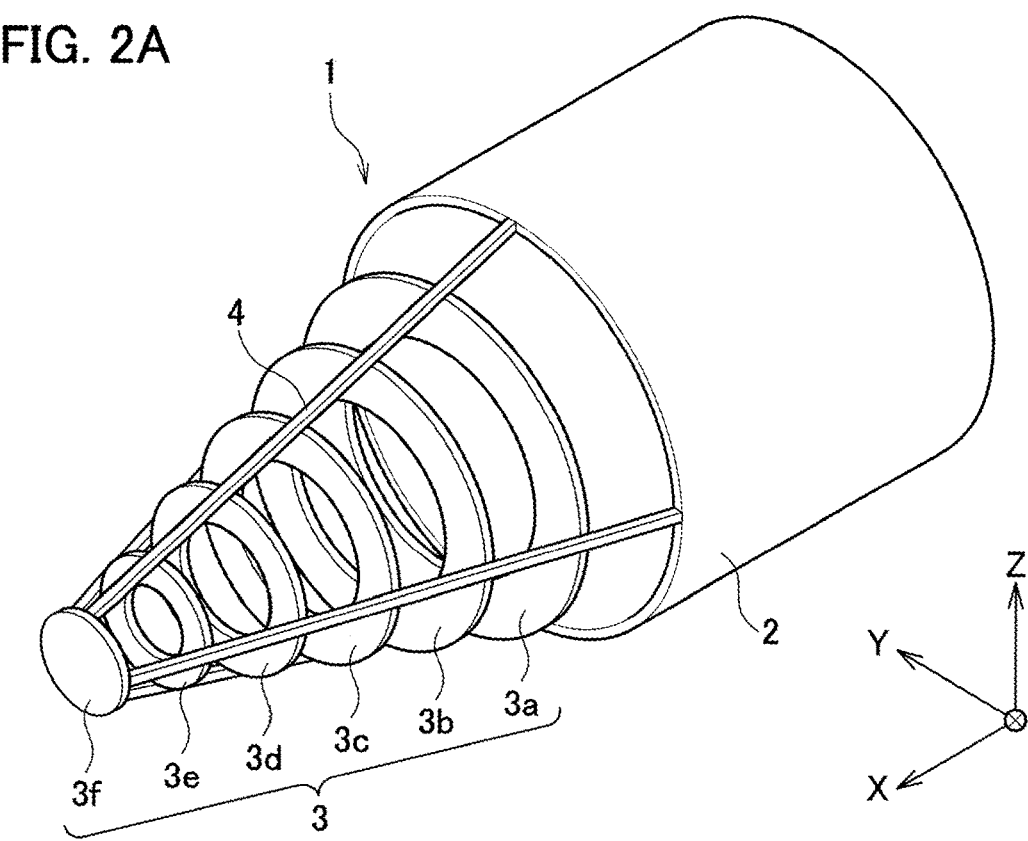
FIG. 2A is a diagram showing an external appearance of a fluid dispersing device according to the embodiment of the present disclosure.
Figure 2B:
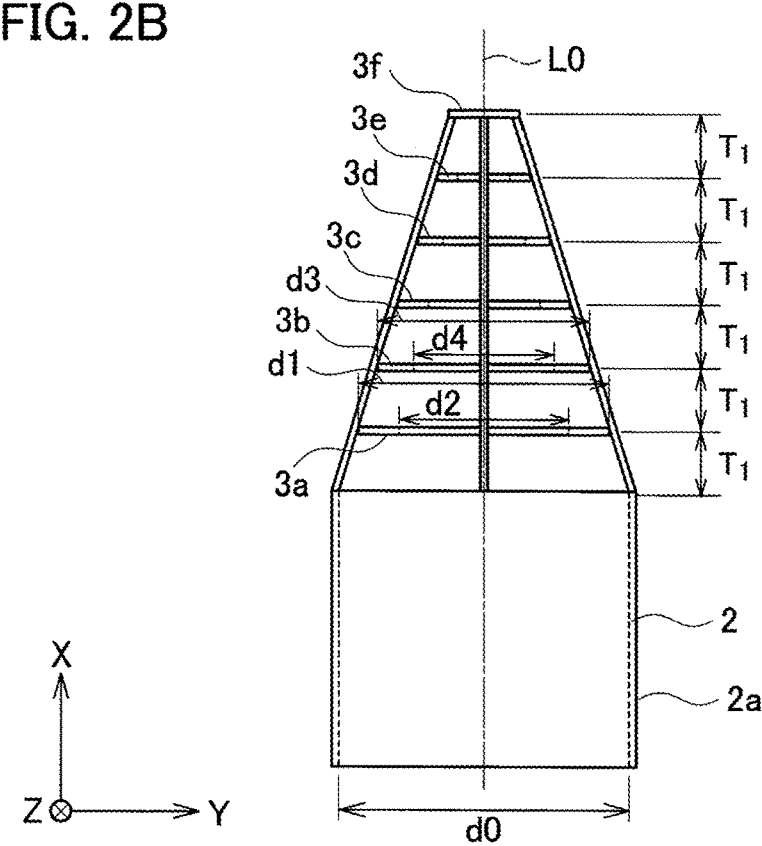
FIG. 2B is a diagram showing a structure of the fluid dispersing device according to the embodiment of the present disclosure.

FIG. 2A is a perspective view showing an external appearance of the fluid dispersing device 1 according to the embodiment. FIG. 2B is a side view showing a structure of the fluid dispersing device 1. The fluid dispersing device 1 disperses a fluid flowing in a particular direction so as to change the flowing direction of the fluid. The fluid dispersing device 1 according to the present embodiment disperses the reaction fluid introduced to the introduction pipe 150*b* so as to flow in preferred directions in the space S. The fluid dispersing device 1 includes a first wall portion 2, a second wall portion 3, and support portions 4.

The first wall portion 2 is a tubular member with an axis L0 extending in a first direction defined as a central axis. The present embodiment defines the X direction as the first direction. The fluid dispersing device 1 may be inserted and fixed to a pipe which is an installation portion to which the fluid dispersing device 1 is installed. In particular, the first wall portion 2 has an outer wall surface 2*a* brought into contact with the inner wall surface 150*b*1 of the introduction pipe 150*b* so as to be fixed to the introduction pipe 150*b* which is the installation portion. Alternatively, the first wall portion 2 may be provided with a flange at an end portion thereof, and the periphery of the opening of the introduction pipe 150*b* may be preliminarily provided with a screw hole conforming to the diameter of the flange, so as to fix the first wall portion 2 by screw fastening via the flange.

The second wall portion 3 includes circular members and a disk-like member 3*f* each having a flat surface separated downward from the first wall portion 2 to cause the reaction fluid passing through the inner space of the first wall portion 2 to collide with the flat surface so as to be dispersed into the external space of the second wall portion 3. The external space is the space S in the reaction fluid introduction part 150. The term "circular" of the circular members refers to a state of being entirely circular, and covers not only a completely-circular state but also a state provided with a slight gap such as a joint or a notch which may be caused during manufacture. The present embodiment may achieve the effects of the present disclosure with at least one circular member, but is illustrated below with a case of including five circular members from a first circular member 3*a* to a fifth circular member 3*e*.

The shape or arrangement position of the respective circular members 3*a* to 3*e* fulfills the following conditions. The first condition is that the respective circular members 3*a* to 3*e* are separated from each other in the first direction. As shown in FIG. 2B, a distance between the respective circular members is preferably set to a fixed interval $T_1$ upon the setting of the outer diameter of the respective circular members in view of dispersion efficiency described below. The intervals between the respective circular members are not necessarily strictly determined, and the present embodiment can also achieve the effects when the intervals vary slightly.

The second condition is that the respective outer diameters of the circular members 3*a* to 3*e* are the same as or smaller than the inner diameter d0 of the first wall portion 2. The circular member having the same outer diameter as the inner diameter d0 of the first wall portion 2 may be the first circular member 3*a* arranged closest to the first wall portion 2. The present embodiment is illustrated with a case in which the outer diameter d1 of first circular member 3*a* is smaller than the inner diameter d0 of the first wall portion 2, as in the case of the other circular members.

The third condition is that one circular member having a first outer diameter and a first inner diameter, and another circular member having a second outer diameter and a second inner diameter and separated downward from the one circular member, fulfill the following conditions: (1) the first outer diameter is the same as or smaller than the inner diameter d0 of the first wall portion 2; (2) the second outer diameter is smaller than the first outer diameter; and (3) the second inner diameter is the same as or smaller than the first inner diameter.

The third condition is described in more detail below with reference to the first circular member 3a and the second circular member 3b. When the third condition is applied to the case of these two circular members, the one circular member is the first circular member 3a, and the other circular member is the second circular member 3b. Referring to FIG. 2B, with regard to item (1) of the third condition, the first outer diameter d1 of the first circular member 3a is smaller than the inner diameter d0 of the first wall portion 2. Only the first circular member 3a may have the first outer diameter d1 which is the same as the inner diameter d0 of the first wall portion 2. With regard to item (2) of the third condition, the second outer diameter d3 of the second circular member 3b is smaller than the first outer diameter d1 of the first circular member 3a. With regard to item (3) of the third condition, the second inner diameter d4 of the second circular member 3b is smaller than the first inner diameter d2 of the first circular member 3a. The second inner diameter d4 of the second circular member 3b and the first inner diameter d2 of the first circular member 3a may be the same. These relationships can be applied to the case between any other two circular members.

The disk-like member 3f is separated downward from the respective circular members 3a to 3e. The outer diameter of the disk-like member 3f is smaller than the outer diameter of the closest circular member, which is the fifth circular member 3e in the present embodiment. The outer diameter of the disk-like member 3f may be the same as that of the closest circular member. The element included in the second wall member 3 most separated from the first wall portion 2 is not a circular member. Due to the structure of the second wall portion 3, the reaction fluid passing through the first wall portion 2 never flows straight or directly out of the second wall portion 3 without changing the flowing direction.

The support portions 4 are stick-like members supporting the respective circular members 3a to 3e on the downstream side of the first wall portion 2 such that each one end is fixed to the first wall portion 2, and the other portions are fixed to the outer circumferences of the respective circular members 3a to 3e. The present embodiment is illustrated with a case in which the number of the support portions 4 provided is four, but is not limited to this case when the support portions 4 hardly block the flow of the reaction fluid.

When the second wall portion 3 fulfills the conditions described above, the second wall portion 3 has a substantially conical shape entirely tapered on the downstream side, as shown in FIG. 2A and FIG. 2B. The second wall portion 3 is provided with openings radially open in a second direction perpendicular to the first direction between the respective adjacent circular members.

The fluid dispersing device 1 according to the present embodiment includes the second wall portion 3 which includes at least one of the circular members 3a to 3e each having a flat surface to cause the reaction fluid passing through the inner space of the first wall portion 2 to collide therewith so as to be dispersed into the external space. Accordingly, the reaction fluid emitted from the second wall portion 3 is dispersed into a plurality of fluid groups flowing in different directions, so as to be introduced into the respective openings 130 provided on the first side surface 101a with high efficiency at a uniform flow rate. As used herein, the term "efficiency" refers to a state in which the reaction fluid is prevented from staying in the space S as much as possible, and more particularly, a state in which the reaction fluid is caused to flow toward the respective openings 130 rapidly as much as possible with less repeated circulation caused in the space S.

Further, since the respective outer diameters of the circular members are the same as or smaller than the inner diameter d0 of the first wall portion 2, the reaction fluid flowing toward the respective circular members is prevented from being blocked on the upstream side. Accordingly, the fluid dispersing device 1 can emit the reaction fluid introduced into the second wall portion 3 from the open regions defined by the respective circular members.

Further, since the second wall portion 3 includes the disk-like member 3f on the downstream side of the respective circular members, the reaction fluid passing through the first wall portion 2 does not flow straight or directly out of the second wall portion 3. When the member included in the second wall portion 3 located on the most downstream side is a circular member, for example, the reaction fluid after passing through the circle of the circular member increases in a flow rate as compared with the flow rate before passing therethrough. As a result, the reaction fluid having passed through the circle and increased in the flow rate agitates the stream around the reaction fluid, which may cause circulation around the second wall portion 3. The present embodiment can prevent the reaction fluid from flowing straight and directly out of the second wall portion 3, namely, prevent the reaction fluid from increasing in the flow rate, so as to emit the reaction fluid more smoothly.

Further, since the fluid dispersing device 1 according to the present embodiment includes the second wall portion 3 which includes at least two of the circular members 3a to 3e, the combination of these circular members can regulate and disperse the fluid into fluid groups so as to flow in preferable directions. The respective circular members formed into the corresponding shape fulfilling the conditions described above can prevent the reaction fluid flowing toward the circular members located on the downstream side from being blocked by the circular members located on the upstream side. Accordingly, the fluid dispersing device 1 can emit the reaction fluid introduced to the second wall portion 3 from any open region defined by the respective circular members 3a to 3e or the disk-like member 3 more smoothly.

OTHER EMBODIMENTS

The above embodiment has been illustrated with the case in which the second wall portion 3 included in the fluid dispersing device 1 includes at least one circular member. The present disclosure is not limited to this case and may include a spiral member instead of the circular member.

Figure 3A:
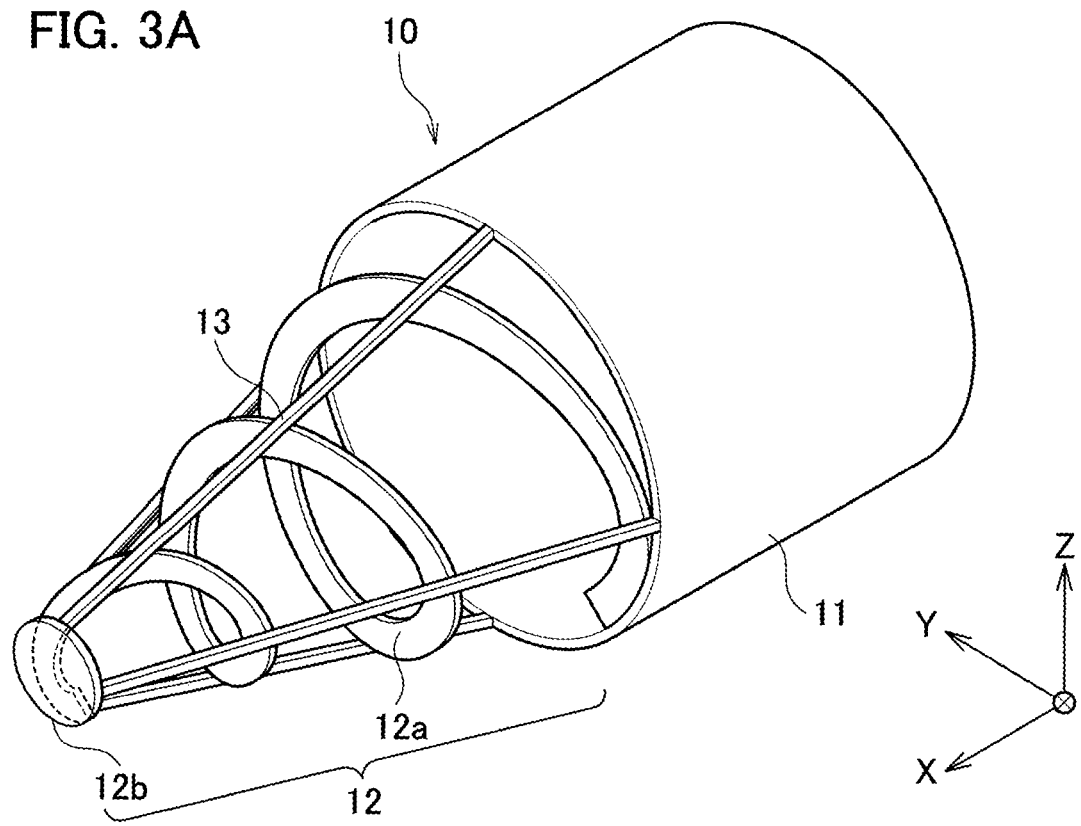
FIG. 3A is a diagram showing an external appearance of a fluid dispersing device according to another embodiment of the present disclosure.
Figure 3B:
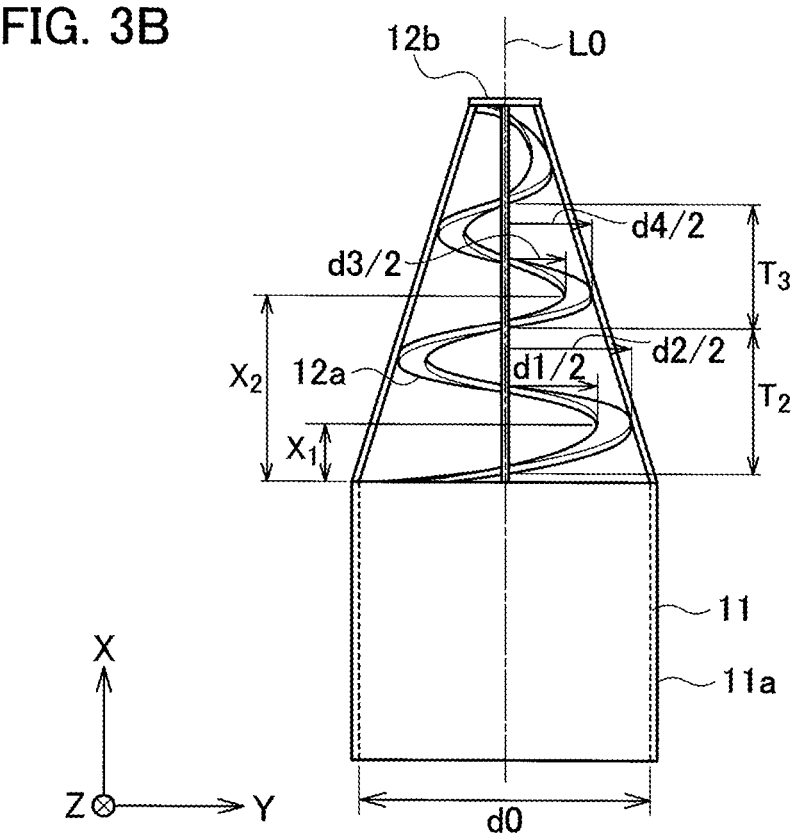
FIG. 3B is a diagram showing a structure of the fluid dispersing device according to the other embodiment of the present disclosure.

FIG. 3A is a perspective view showing an external appearance of a fluid dispersing device 10 according to another embodiment. FIG. 3B is a side view showing a structure of the fluid dispersing device 10. The fluid dispersing device 10 includes a first wall portion 11, a second wall portion 12, and support portions 13. The first wall portion 11, the disk-like member 12b included in the second wall portion 12, and the support portions 13 are the same as the corresponding elements in the fluid dispersing device 1 described above, and overlapping explanations are not repeated below.

The second wall portion 12 also includes a circular member having a flat surface separated downward from the first wall portion 11 to cause the reaction fluid passing through the inner space of the first wall portion 11 to collide with the flat surface so as to be dispersed into the external space of the second wall portion 12, as in the case of the second wall portion 3 of the fluid dispersing device 1. The circular member 12a included in the second wall portion 12 in the fluid dispersing device 10 has a shape with the outer diameter and the inner diameter decreased gradually from the upstream side to the downstream side while making circles about the central axis L0. FIG. 3A and FIG. 3B illustrate a case in which the circular member 12a is a continuous single member, but the circular member 12a may be divided into parts that entirely have a spiral structure. The connected portions between the respective parts are not necessarily completely connected together, and may be provided with slight gaps. The disk-like member 12b is not necessarily separated from the circular member 12a, and may be in contact with the downstream end of the circular member 12a, as shown in FIG. 3B.

Referring to a position in the circular member 12a at a distance $X_1$ from the end surface of the first wall portion 11 toward the second wall portion 12, a first outer diameter at this position is defined as d2/2, and a first inner diameter is defined as d1/2. Referring to a position in the circular member 12a at a distance $X_2$ from the end surface of the first wall portion 11 toward the second wall portion 12 on the downstream side of the position at the distance $X_1$, a second outer diameter at this position is defined as d4/2, and a second inner diameter is defined as d3/2. In comparison between the two positions, as shown in FIG. 3B, the second outer diameter at the position at the distance $X_2$ is smaller than the first outer diameter at the position at the distance $X_1$. The second inner diameter at the position at the distance $X_2$ is smaller than the first inner diameter at the position at the distance $X_1$.

The second wall portion 12, when fulfilling the conditions described above, has a substantially conical shape entirely tapered on the downstream side, as shown in FIG. 3A and FIG. 3B. The second wall portion 12 is provided with openings open in an entirely-revolving state in the second direction different from the first direction between plane surfaces at the two positions in the circular member 12a each defined when making a circle about the axis L0. The intervals in the X direction at the two positions in the circular member 12a each defined when making a circle about the axis L0, are decreased gradually toward the downstream side, in comparison between the intervals $T_2$ and $T_3$ shown in FIG. 3B.

The fluid dispersing device 10 according to the present embodiment disperses the reaction fluid emitted from the second wall portion 12 into a plurality of fluid groups flowing in different flowing directions, as in the case of the fluid dispersing device 1. Accordingly, the reaction fluid dispersed can be introduced to the respective openings 130 provided on the first side surface 101a with high efficiency at a uniform flow rate.

Since the circular member 12a has a shape with the outer diameter and the inner diameter decreased gradually from the upstream side to the downstream side while making circles about the central axis L0, the reaction fluid flowing to the circular member 12a is prevented from being blocked on the upstream side. Accordingly, the fluid dispersing device 10 can emit the reaction fluid introduced to the second wall portion 12 from the open regions defined by the circular member 12a more smoothly.

The fluid dispersing devices 1 and 10 according to the embodiments above are each fixed to the introduction pipe 150b such that the outer wall surface 2a of the tubular first wall portion 2 or the outer wall surface 11a of the first wall portion 11 is inserted to be in contact with the inner wall surface 150b1 of the introduction pipe 150b which is the installation portion.

The fluid dispersing devices 1 and 10 according to the embodiments above do not need to be fixed with screws, so as to facilitate the installation to the installation portion. The facilitation of the installation has the advantage of broadening the applications of the fluid dispersing devices 1 and 10, since the fluid dispersing devices 1 and 10 can be easily installed in various types of pipes not provided with screw holes for fixation around the pipes, in addition to the installation to the introduction pipe 150b of the reaction fluid introduction part 150.

The heat treatment device according to the respective embodiments uses the fluid dispersing device 1 or 10 according to each embodiment in the reaction fluid introduction part 150, so as to introduce the reaction fluid to the respective reaction channels FR1 to FR3 with high efficiency at a uniform flow rate. Accordingly, the amount of a product produced in the respective reaction channels FR1 to FR3 can be equalized, which contributes to improving the efficiency of production of the product. When the heat treatment device using the fluid dispersing device according to the respective embodiments is a heat exchanger, the efficiency of heat exchange in the entire device can be improved since the flow in each channel is equalized.

The above embodiment has been illustrated with the case in which the flat surfaces of the respective circular members 3a to 3e included in the second wall portion 3 are perpendicular to the axis L0 which is the central axis of the first wall portion 2. The present disclosure is not limited to this case, and the flat surfaces of the respective circular members 3a to 3e may be inclined slightly with respect to the axis L0, for example.

The respective embodiments have been illustrated with the case in which the reaction fluid introduction part 150 is the casing having the curved wall surface 150a curved concavely. The present disclosure is not limited to this case, and the casing of the reaction fluid introduction part 150 may have a rectangular shape provided with an open surface.

It should be understood that the present disclosure includes various embodiments which are not disclosed herein. Therefore, the scope of the present disclosure is defined only by the matters according to the claims reasonably derived from the description above.

What is claimed is:
1. A fluid dispersing device comprising:
a first wall portion which is a tube, with an axis extending in a first direction defined as a central axis; and
a second wall portion separated downward from the first wall portion,
the second wall portion including at least one flat annular plate member and a disk-like member each having a continuous flat surface for causing a fluid which passes through an inner space of the first wall portion to collide therewith,
the disk-like member being separated downward from the flat annular plate member,
the flat annular plate member having an outer diameter equal to or smaller than an inner diameter of the first wall portion, and
the disk-like member having an outer diameter equal to or smaller than an outer diameter of the closest flat annular plate member, wherein
the continuous flat surface of the at least one flat annular plate member is configured such that none of the fluid is allowed to pass through the at least one flat annular plate member, and
the continuous flat surface of the disk-like member is configured such that none of the fluid is allowed to pass through the disk-like member.

2. The fluid dispersing device according to claim 1, wherein:
the flat annular plate member includes a first flat annular plate member having a first outer diameter and a first inner diameter, and a second flat annular plate member having a second outer diameter and a second inner diameter and separated from the first flat annular plate member downward in the first direction;
the first outer diameter is equal to or smaller than the inner diameter of the first wall portion;
the second outer diameter is smaller than the first outer diameter; and
the second inner diameter is equal to or smaller than the first inner diameter.

3. The fluid dispersing device according to claim 1, wherein the first wall portion has an outer wall surface to be brought into contact with an inner wall surface of a pipe which is an installation portion so that the first wall portion is fixed to the pipe.

4. A fluid dispersing device comprising:
a tubular first wall portion with an axis extending in a first direction defined as a central axis; and
a second wall portion separated downward from the first wall portion, the second wall portion including a conical helical member and a disk-like member,
the disk-like member having a continuous flat surface for causing a fluid which passes through an inner space of the first wall portion to collide therewith,
the conical helical member forming a conical shape with an outer diameter and an inner diameter decreased gradually from an upstream side to a downstream side while making a circle about the central axis, the conical helical member having a continuous curved surface for causing the fluid to collide therewith, and
the disk-like member being located on the downstream side of the conical helical member,
wherein
the continuous curved surface of the conical helical member is configured such that none of the fluid is allowed to pass through the conical helical member, and
the continuous flat surface of the disk-like member is configured such that none of the fluid is allowed to pass through the disk-like member.

5. The fluid dispersing device according to claim 4, wherein the first wall portion has an outer wall surface to be brought into contact with an inner wall surface of a pipe which is an installation portion so that the first wall portion is fixed to the pipe.

6. A heat treatment device utilizing heat exchange between a first fluid and a second fluid, the device comprising:
a heat exchange unit including a first heat transfer body including a plurality of first channels through which the first fluid flows, and a second heat transfer body including a plurality of second channels through which the second fluid flows, the first heat transfer body and the second heat transfer body being stacked with each other; and
a fluid introduction part having a space with an open surface on which openings of the respective first channels in the heat exchange unit are open, and introducing the externally-introduced first fluid to the respective first channels,
the fluid introduction part including the fluid dispersing device according to claim 1 to disperse the externally-introduced first fluid in the space.

7. A heat treatment device utilizing heat exchange between a first fluid and a second fluid, the device comprising:
a heat exchange unit including a first heat transfer body including a plurality of first channels through which the first fluid flows, and a second heat transfer body including a plurality of second channels through which the second fluid flows, the first heat transfer body and the second heat transfer body being stacked with each other; and
a fluid introduction part having a space with an open surface on which openings of the respective first channels in the heat exchange unit are open, and introducing the externally-introduced first fluid to the respective first channels,
the fluid introduction part including the fluid dispersing device according to claim 4 to disperse the externally-introduced first fluid in the space.

* * * * *